(12) United States Patent
Nakamura et al.

(10) Patent No.: US 10,638,290 B2
(45) Date of Patent: Apr. 28, 2020

(54) COMMUNICATION TERMINAL AND COMMUNICATION SYSTEM

(71) Applicant: MINEBEA MITSUMI Inc., Nagano (JP)

(72) Inventors: Yoshihiro Nakamura, Fukuroi (JP); Kohei Nishibori, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/800,231

(22) Filed: Nov. 1, 2017

(65) Prior Publication Data

US 2018/0139568 A1 May 17, 2018

(30) Foreign Application Priority Data

Nov. 17, 2016 (JP) .................... 2016-224424

(51) Int. Cl.
| | | |
|---|---|---|
| *H04W 4/70* | (2018.01) | |
| *H04Q 9/00* | (2006.01) | |
| *H04W 4/80* | (2018.01) | |
| *H04W 4/38* | (2018.01) | |
| *H04W 88/16* | (2009.01) | |

(52) U.S. Cl.
CPC ............ *H04W 4/70* (2018.02); *H04Q 9/00* (2013.01); *H04W 4/38* (2018.02); *H04W 4/80* (2018.02); *H04Q 2209/10* (2013.01); *H04Q 2209/25* (2013.01); *H04Q 2209/40* (2013.01); *H04Q 2209/43* (2013.01); *H04W 88/16* (2013.01)

(58) Field of Classification Search
CPC .......... H04W 4/70; H04W 88/16; H04Q 9/00; H04Q 2209/43; H04Q 2209/10; H04Q 2209/40; H04Q 2209/25
See application file for complete search history.

(56) References Cited

U.S. PATENT DOCUMENTS

| | | | |
|---|---|---|---|
| 2006/0171313 A1* | 8/2006 | Shimonishi | H04L 1/1874 370/229 |
| 2007/0127379 A1 | 6/2007 | Gossain et al. | |
| 2008/0031139 A1* | 2/2008 | Muro | H04W 28/08 370/237 |

(Continued)

FOREIGN PATENT DOCUMENTS

| | | |
|---|---|---|
| JP | 2009-033422 A | 2/2009 |
| JP | 2009-517987 A | 4/2009 |

(Continued)

OTHER PUBLICATIONS

Japanese Office Action for corresponding Japanese Patent Application No. 2016-224424, dated Dec. 18, 2018.

*Primary Examiner* — Hassan Kizou
*Assistant Examiner* — Abdullahi Ahmed
(74) *Attorney, Agent, or Firm* — Pearne & Gordon LLP (57) ABSTRACT

A communication terminal according to an embodiment includes a communication unit configured to transmit first information to a relay apparatus that receives information transmitted from a plurality of communication terminals and transmits the received information to a server, and includes a determination unit configured to determine a transmission timing of second information transmitted by the communication unit after transmission of the first information on the basis of a communication state of the relay apparatus at the time of transmission of the first information.

7 Claims, 4 Drawing Sheets

(56) References Cited

U.S. PATENT DOCUMENTS

| | | | |
|---|---|---|---|
| 2008/0095040 A1* | 4/2008 | Kwon | H04L 1/1854 |
| | | | 370/210 |
| 2008/0123582 A1* | 5/2008 | Maekawa | H04W 88/10 |
| | | | 370/315 |
| 2011/0228714 A1* | 9/2011 | Akbari | H04L 1/188 |
| | | | 370/310 |

FOREIGN PATENT DOCUMENTS

| | | |
|---|---|---|
| JP | 2014-079026 A | 5/2014 |
| JP | 2014-192661 A | 10/2014 |
| JP | 2015-104013 A | 6/2015 |
| WO | 2016/152307 A1 | 1/2018 |

* cited by examiner

COMMUNICATION TERMINAL AND COMMUNICATION SYSTEM

CROSS-REFERENCE TO RELATED APPLICATION(S)

The present application claims priority to and incorporates by reference the entire contents of Japanese Patent Application No. 2016-224424 filed in Japan on Nov. 17, 2016.

BACKGROUND OF THE INVENTION

1. Field of the Invention

The present invention relates to a communication terminal and a communication system.

2. Description of the Related Art

Conventionally, there is a known communication system that transmits sensor information collected by a plurality of communication terminals equipped with a sensor installed in a sensor network to a server via a relay apparatus that relays the network, thereby causing the server to aggregate the sensor information. An exemplary relay apparatus of this includes a relay apparatus including a database that accumulates and stores, for each transmission destination, a packet to which accumulation information is attached transmitted from a node, a timer management unit that manages intervals of transmitting the packet accumulated and stored in the database to a server, and a communication unit that transmits the packet to the server at this interval (refer to JP 2014-192661 A, for example).

With the communication system described in JP 2014-192661 A, it is possible to alleviate the load on the server generated in communication between the relay apparatus and the server. In a case, however, where sensor information is transmitted from a communication terminal to a relay apparatus in the communication system described in JP 2014-192661 A, executing transmission of the sensor information to the relay apparatus simultaneously by a plurality of communication terminals would increase the load on the relay apparatus. This hinders proper reception of the sensor information by the relay apparatus due to generation of collision, buffer overflow, or the like, and delays transmission of an acknowledgment (ACK), or the like, by the relay apparatus to the plurality of communication terminals in some cases. This deteriorates reliability of the communication between the communication terminal and the relay apparatus, increasing communication volume and degrading the real-time performance.

SUMMARY OF THE INVENTION

A communication terminal according to one embodiment of the present invention includes a communication unit configured to transmit first information to a relay apparatus that receives information transmitted from a plurality of communication terminals and transmits the received information to a server, and includes a determination unit configured to determine a transmission timing of second information transmitted by the communication unit after transmission of the first information on the basis of a communication state of the relay apparatus at the time of transmission of the first information.

DETAILED DESCRIPTION OF THE PREFERRED EMBODIMENTS

Figure 1:
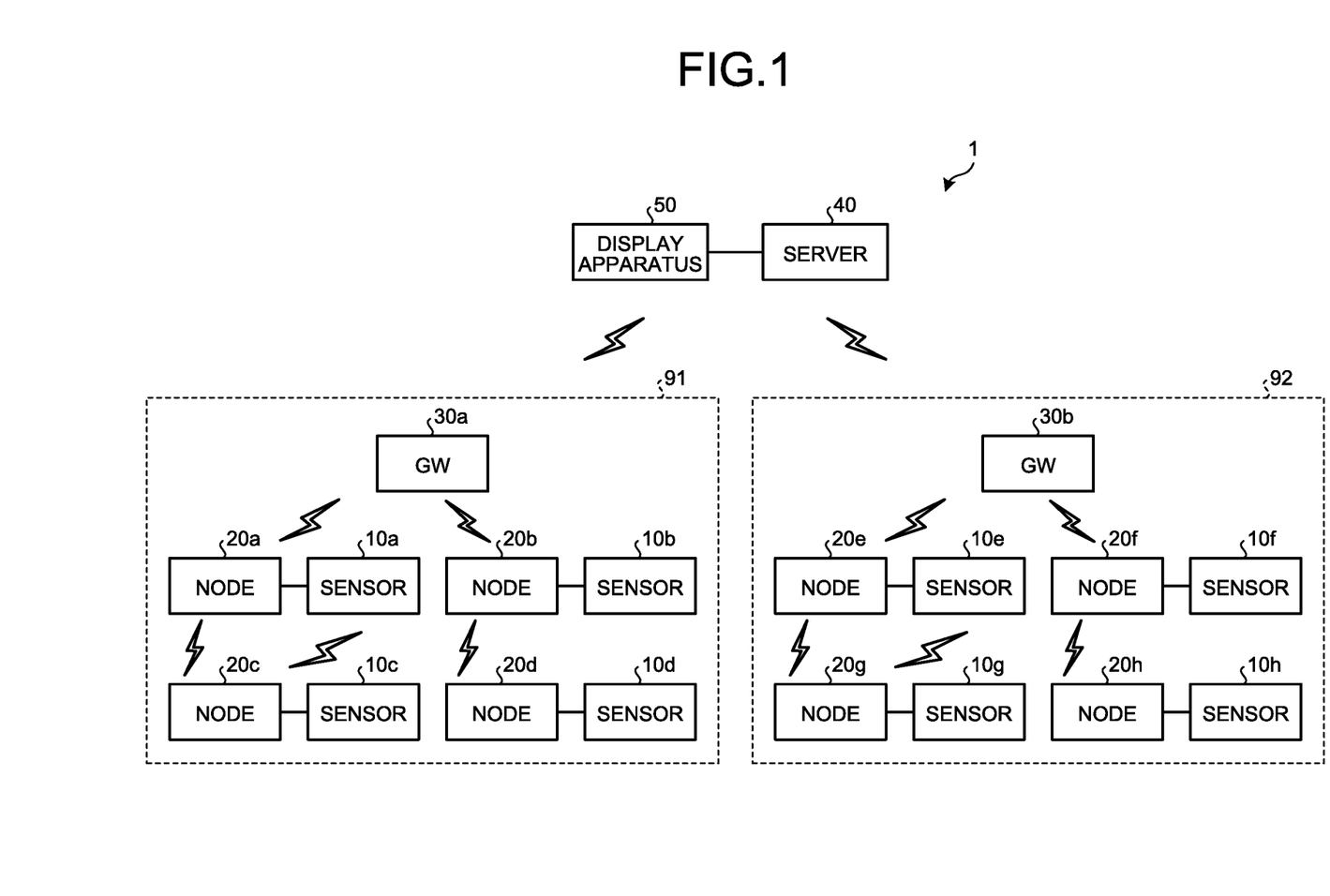
FIG. 1 is a diagram illustrating an exemplary configuration of a communication system according to an embodiment.

Hereinafter, a communication terminal and a communication system according to an embodiment will be described with reference to the drawings. FIG. 1 is a diagram illustrating an exemplary configuration of a communication system 1 according to the embodiment.

As illustrated in FIG. 1, the communication system 1 according to the embodiment includes eight sensors 10a to 10h, eight nodes (communication terminals) 20a to 20h, two gateways (GW; relay apparatus) 30a and 30b, a server 40, and a display apparatus 50. In the following, the sensors 10a to 10h will be collectively referred to as the sensor 10 in a case where they are not distinguished from each other, the nodes 20a to 20h will be collectively referred to as the node 20 in a case where they are not distinguished from each other, and the GW 30a and 30b will be collectively referred to as the GW 30 in a case where they are not distinguished from each other.

The number of GWs 30 is not limited to two, and may be one, or three or more. Moreover, the number of nodes 20 directly or indirectly connected to each of the GWs 30 may be any number as long as the number is plural.

For example, the communication system 1 is provided in a factory in which a plurality of machine tools is installed. In the communication system 1, the sensor 10 detects a state of the machine tool, and the node 20 transmits sensor information (also referred to as state information) indicating the state of the machine tool detected by the sensor 10 to the server 40 via the GW 30, and the server 40 collects the sensor information. The sensor information is information indicating any of a state in which the machine tool is normally operating (normal state) and a state in which the operation of the machine tool is abnormal (abnormal state), for example. The server 40 displays the state of the machine tool indicated by the collected sensor information on the display apparatus 50. In this manner, the communication system 1 allows a user such as an administrator of a factory to grasp the state of the plurality of machine tools.

The sensor 10 is connected to the node 20 and attached to the machine tool. The sensor 10 detects the state of the machine tool at a predetermined time interval (for example, five seconds), and notifies the node 20 of the detected state. For example, in order to detect the states of all the machine tools, each of the plurality of sensors 10 is attached to each of the plurality of machine tools, thereby detecting the state of each of the plurality of machine tools. The sensor 10 is an exemplary detection unit, and the machine tool is an exemplary detection target.

For example, the sensor 10a is connected to the node 20a and notifies the node 20a of the state of the machine tool at predetermined time intervals. The sensor 10b is connected to the node 20*b* and notifies the node 20*b* of the state of the machine tool at predetermined time intervals. The sensor 10*c* is connected to the node 20*c* and notifies the node 20*c* of the state of the machine tool at predetermined time intervals. The sensor 10*d* is connected to the node 20*d* and notifies the node 20*d* of the state of the machine tool at predetermined time intervals. The sensor 10*e* is connected to the node 20*e* and notifies the node 20*e* of the state of the machine tool at predetermined time intervals. The sensor 10*f* is connected to the node 20*f* and notifies the node 20*f* of the state of the machine tool at predetermined time intervals. The sensor 10*g* is connected to the node 20*g* and notifies the node 20*g* of the state of the machine tool at predetermined time intervals. The sensor 10*h* is connected to the node 20*h* and notifies the node 20*h* of the state of the machine tool at predetermined time intervals. Each of the sensors 10*a* to 10*h* is attached to each of mutually different machine tools.

The sensor 10 is a temperature sensor, for example. In a case where the sensor 10 is a temperature sensor, the sensor 10 detects the temperature of the machine tool and notifies the node 20 of the detected temperature. In a case where the temperature of the machine tool detected by the sensor 10 is within a temperature range (normal temperature range) indicating the normal state of the machine tool, the node 20 determines that the machine tool is in the normal state. In contrast, in a case where the temperature of the machine tool detected by the sensor 10 is not within the normal temperature range, the node 20 determines that the machine tool is in the abnormal state.

In response to the change in the state of the machine tool notification of which is provided from the sensor 10, the node 20 generates sensor information indicating the state after the change, and transmits the generated sensor information to the GW 30. For example, in a case where the state of the machine tool changes from the normal state to the abnormal state, the node 20 transmits the sensor information indicating the abnormal state after the change to the GW 30. Moreover, when the state of the machine tool changes from the abnormal state to the normal state, the node 20 transmits the sensor information indicating the normal state after the change to the GW 30.

A mesh network 91 is formed by the nodes 20*a* to 20*d* and the GW 30*a*, and a mesh network 92 is formed by the nodes 20*e* to 20*h* and the GW 30*b*.

For example, among the nodes 20*a* to 20*d*, the nodes 20*a* and 20*b* can wirelessly communicate directly with the GW 30*a*, the node 20*c* can wirelessly communicate indirectly with the GW 30*a* via the node 20*a* or the node 20*b*, and the node 20*d* can wirelessly communicate indirectly with the GW 30*a* via the node 20*b*.

Accordingly, the node 20*a* and the node 20*b* directly transmit the sensor information to the GW 30*a*, the node 20*c* transmits the sensor information to the GW 30*a* via the node 20*a* or the node 20*b*, and the node 20*d* transmits the sensor information to the GW 30*a* via the node 20*b*. That is, the node 20*a* relays the sensor information generated by the node 20*c*. The node 20*b* relays the sensor information generated by the node 20*c* and the sensor information generated by the node 20*d*.

Among the nodes 20*e* to 20*h*, the nodes 20*e* and 20*f* can wirelessly communicate directly with the GW 30*b*, the node 20*g* can wirelessly communicate indirectly with the GW 30*b* via the node 20*e* or the node 20*f*, and the node 20*h* can wirelessly communicate indirectly with the GW 30*b* via the node 20*f*.

Accordingly, the node 20*e* and the node 20*f* directly transmit the sensor information to the GW 30*b*, the node 20*g* transmits the sensor information to the GW 30*b* via the node 20*e* or the node 20*f*, and the node 20*h* transmits the sensor information to the GW 30*b* via the node 20*f*. That is, the node 20*e* relays the sensor information generated by the node 20*g*. The node 20*f* relays the sensor information generated by the node 20*g* and the sensor information generated by the node 20*h*.

Note that each of the nodes 20*a* to 20*d* may be configured to be capable of performing direct wireless communication with the GW 30*a*, or each of the nodes 20*e* to 20*h* may be configured to be capable of performing direct wireless communication with the GW 30*b*.

Note that the node 20 may have a patrol lamp (not illustrated) and may control the color of the light emitted from the patrol lamp in accordance with the state of the machine tool notification of which is provided from the sensor 10. For example, the node 20 may control the patrol lamp so as to emit green light when the state of the machine tool is the normal state, and may control the patrol lamp so as to emit red light when the state of the machine tool is the abnormal state.

The GW 30 can wirelessly communicate with the server 40 and the node 20. The GW 30 receives the sensor information transmitted from the node 20 and transmits the received sensor information to the server 40. That is, the GW 30 relays the sensor information. Moreover, upon receiving the sensor information, the GW 30 transmits an ACK to the node 20 as a transmission source of the sensor information.

The server 40 is implemented by a computer, for example. Upon receiving the sensor information transmitted from the GW 30, the server 40 displays the state of the machine tool indicated by the received sensor information on the display apparatus 50.

The display apparatus 50 is implemented by a liquid crystal display, for example. The display apparatus 50 displays the states of all the machine tools in the factory under the control of the server 40. This enables the user to grasp the states of all the machine tools in the factory.

Figure 2:
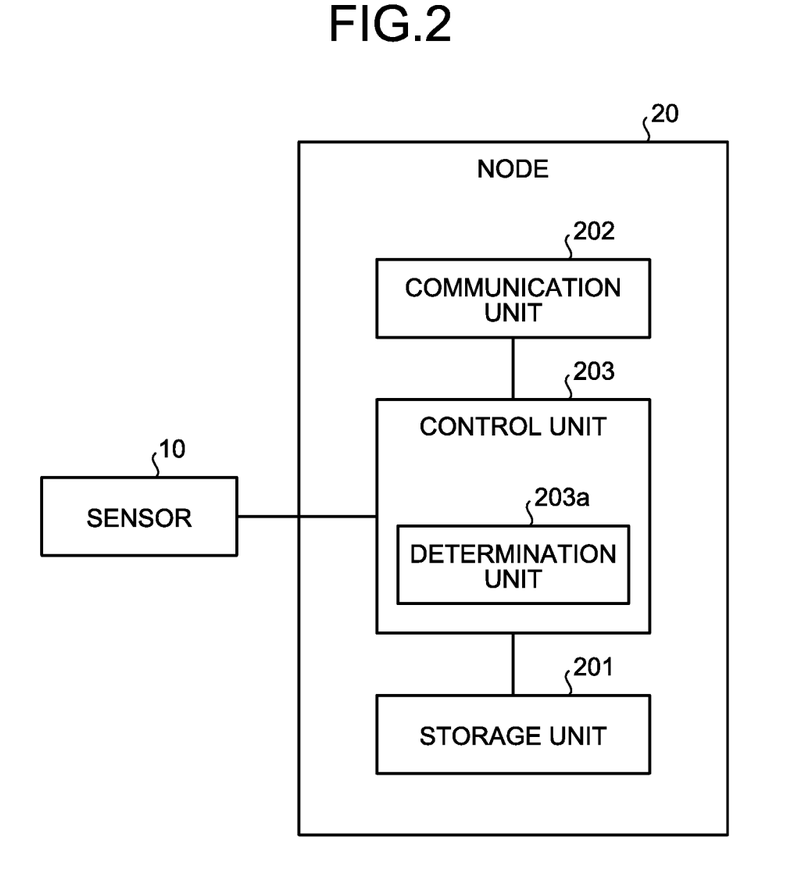
FIG. 2 is a diagram illustrating an exemplary configuration of a node according to the embodiment.

Next, an exemplary configuration of the node 20 according to the embodiment will be described with reference to FIG. 2. FIG. 2 is a diagram illustrating an exemplary configuration of the node 20 according to the embodiment.

As illustrated in FIG. 2, the node 20 includes a storage unit 201, a communication unit 202, and a control unit 203.

The storage unit 201 is implemented by a storage apparatus such as a memory. The storage unit 201 stores various programs to be executed by the control unit 203. For example, the storage unit 201 stores a sensor information transmission program for executing sensor information transmission processing of transmitting sensor information. The storage unit 201 also temporarily stores various types of data used in execution of various programs by the control unit 203.

The communication unit 202 is implemented by a network interface card (a communicator), for example, that performs wireless communication in accordance with a standard such as Wi-fi (registered trademark) and Bluetooth (registered trademark). In a case where direct communication with the GW 30 is possible, the communication unit 202 performs wireless communication with the GW 30. In a case where direct communication with the GW 30 is difficult, the communication unit 202 performs wireless communication with the node 20 serving as a relay to the GW 30.

The control unit 203 is implemented by a processor such as a central processing unit (CPU). The control unit 203 controls the entire node 20. The control unit 203 reads various programs stored in the storage unit 201 and executes the read program, thereby executing various types of processing. For example, the control unit 203 executes the sensor information transmission processing by executing the sensor information transmission program.

As illustrated in FIG. 2, the control unit 203 includes a determination unit 203a in functional representation of the control unit 203 that executes the sensor information transmission processing.

Figure 3:
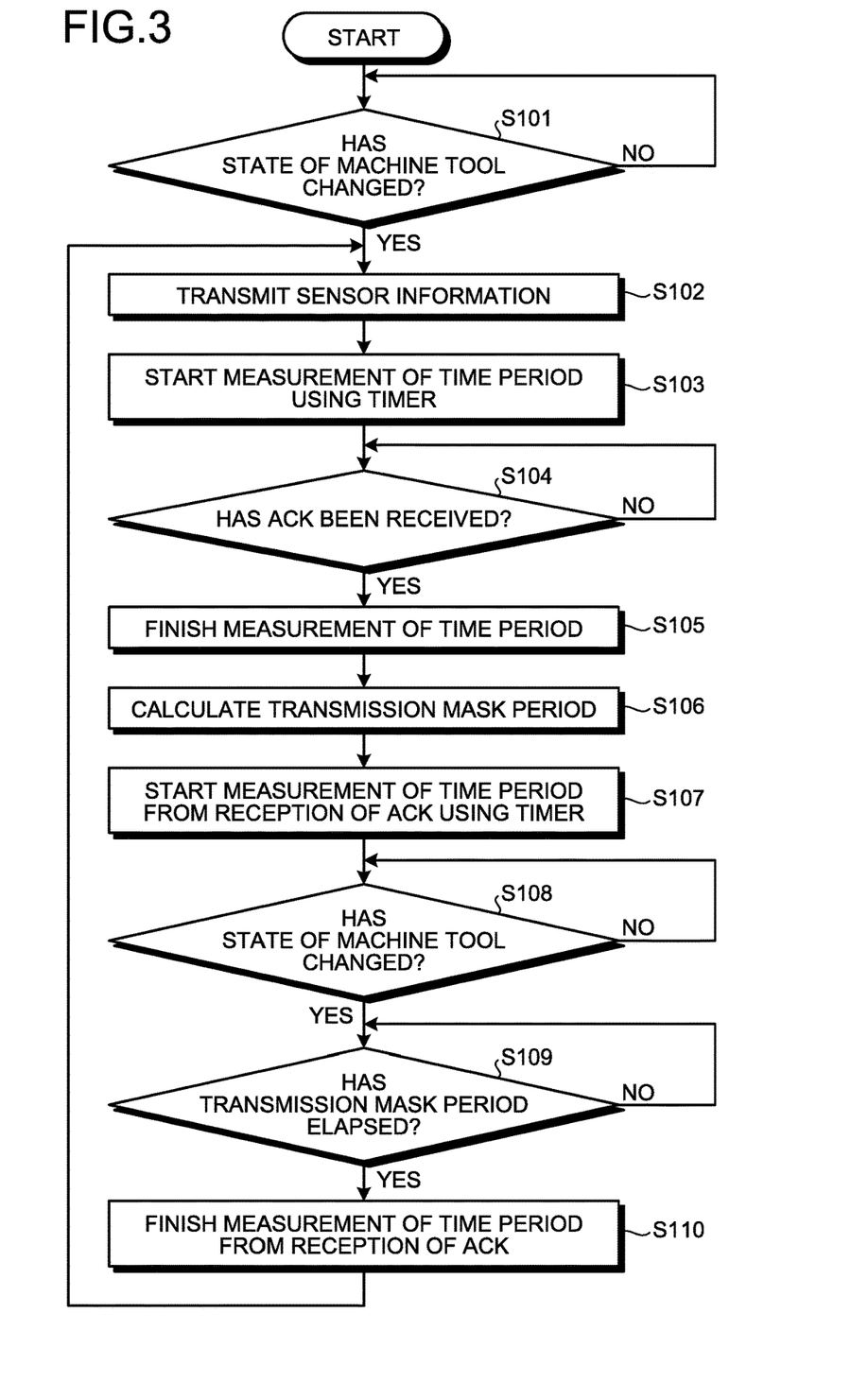
FIG. 3 is a flowchart illustrating a flow of a sensor information transmission processing executed by a control unit according to the embodiment.

Next, the sensor information transmission processing will be described with reference to FIG. 3. FIG. 3 is a flowchart illustrating a flow of the sensor information transmission processing to be executed by the control unit 203 according to the embodiment. The sensor information transmission processing is executed after power is supplied to the control unit 203 from a power supply (not illustrated).

As illustrated in FIG. 3, the determination unit 203a of the control unit 203 determines whether the state of the machine tool notification of which is provided by the sensor 10 has changed (Step S101). In a case where it is determined that the state of the machine tool has not changed (Step S101: No), the determination unit 203a performs the determination of Step S101 again. That is, the determination unit 203a waits in Step S101 until the state of the machine tool changes.

In a case where it is determined that the state of the machine tool has changed (Step S101: Yes), the determination unit 203a generates sensor information indicating the state of the machine tool after the change, and controls the communication unit 202 so as to transmit the generated sensor information toward the GW 30 (Step S102). With this control, the communication unit 202 transmits the sensor information toward the GW 30.

Subsequently, the determination unit 203a starts measurement of the time period from the transmission of the sensor information to the reception of the ACK transmitted from the GW 30 (Step S103) using a software timer.

Subsequently, the determination unit 203a determines whether the ACK has been received from the GW 30 (Step S104). In a case where it is determined that the ACK has not been received (Step S104: No), the determination unit 203a performs the determination of S104 again. That is, the determination unit 203a waits in Step S104 until the ACK is received.

In a case where the ACK has not been received even after a lapse of a predetermined time period since transmission of the sensor information toward the GW 30, the determination unit 203a controls the communication unit 202 so as to transmit the sensor information again. In this case, the determination unit 203a starts the above-described measurement of the time period using the timer again. In a case where the ACK has not been received even after retransmission of the sensor information by a predetermined number of times, the determination unit 203a discards the sensor information, and thereafter, returns to the above-described Step S101.

In a case where it is determined that the ACK has been received (Step S104: Yes), the determination unit 203a finishes the measurement of the time period using the timer (Step S105). This procedure measures the time period from the transmission of the sensor information to the reception of ACK by the node 20. The time period from the transmission of the sensor information to the reception of the ACK is an example of a first time period. The ACK is an example of reception information indicating that the GW 30 has received the sensor information.

Subsequently, the determination unit 203a calculates a transmission mask period, a time period obtained by multiplying the time period from the transmission of the sensor information to the reception of the ACK by a coefficient 1.1 (Step S106). While 1.1 is used as an exemplary coefficient, the value of the coefficient is not limited to this. The transmission mask period is an example of a second time period.

Subsequently, using the software timer, the determination unit 203a starts measuring the time period after reception of the ACK (time period after it is determined in Step S104 that the ACK has been received) (Step S107).

Subsequently, the determination unit 203a determines whether the state of the machine tool notification of which is provided by the sensor 10 has changed (Step S108). In a case where it is determined that the state of the machine tool has not changed (Step S108: No), the determination unit 203a performs the determination of Step S108 again. That is, the determination unit 203a waits in Step S108 until the state of the machine tool changes.

In a case where it is determined that the state of the machine tool has changed (Step S108: Yes), the determination unit 203a determines whether the transmission mask period has elapsed from the reception of the ACK by comparing the transmission mask period calculated in Step S106 with the time period after reception of the ACK the measurement of which is started in Step S107 (Step S109).

In a case where it is determined that the transmission mask period has not elapsed (Step S109: No), the determination unit 203a performs the determination of Step S109 again. That is, the determination unit 203a waits in Step S109 until the transmission mask period has elapsed.

In a case where it is determined that the transmission mask period has elapsed (Step S109: Yes), the determination unit 203a finishes the measurement of the time period after reception of the ACK using the timer (Step S110). Subsequently, the determination unit 203a returns to the above-described Step S102, generates sensor information indicating the state of the machine tool after the change, and controls the communication unit 202 so as to transmit the generated sensor information toward the GW 30. Subsequently, the determination unit 203a executes the processing of Step S103 and the subsequent steps again. That is, the determination unit 203a repeatedly executes the processing of Steps S102 to S110.

In a case where the state of the machine tool has newly changed during waiting in Step S109, the determination unit 203a may perform control so as to newly generate sensor information indicating the state of the machine tool after the change, queue the sensor information using the first-in-first-out (FIFO) method, and allow the sensor information to be transmitted sequentially from the oldest sensor information.

In the sensor information transmission processing described above, the determination unit 203a controls the communication unit 202 so as to transmit the sensor information toward the GW 30 in the first Step S102, whereby the communication unit 202 transmits the sensor information toward the GW 30. Subsequently, in the first Step S106, the determination unit 203a determines a transmission timing of the sensor information to be transmitted by the communication unit 202 in the second Step S102 after the sensor information transmitted in the first Step S102 on the basis of the communication state of the GW 30 at the time of transmission of the sensor information transmitted in the first Step S102 (for example, the communication state between the GW 30 and the plurality of nodes 20). Subsequently, the determination unit 203a controls the communication unit 202 so as to transmit the sensor information toward the GW 30 in the second Step S102.

Herein, when N is a natural number, the processing to be executed by the determination unit 203a can be generalized as follows. For example, the determination unit 203a controls the communication unit 202 so as to transmit the sensor information toward the GW 30 in the Nth Step S102, whereby the communication unit 202 transmits the sensor information toward the GW 30. Subsequently, in the Nth Step S106, the determination unit 203a determines a transmission timing of the sensor information to be transmitted by the communication unit 202 in the (N+1)th Step S102 after the sensor information transmitted in the Nth Step S102 on the basis of the communication state of the GW 30 at the time of transmission of the sensor information transmitted in the Nth Step S102. Subsequently, the determination unit 203a controls the communication unit 202 so as to transmit the sensor information toward the GW 30 in the (N+1)th Step S102.

Note that the sensor information transmitted in the Nth Step S102 is an example of first information and the sensor information transmitted in the (N+1)th Step S102 is an example of second information. Moreover, a state of the machine tool indicated by the first information is an example of a first state, and a state of the machine tool indicated by the second information is an example of a second state.

In the sensor information transmission processing, the determination unit 203a determines a transmission timing of the sensor information to be transmitted in (N+1)th Step S102 on the basis of the time period from the transmission of the sensor information in the Nth Step S102 to the reception of the ACK from the GW 30 in the Nth Step S104.

In the sensor information transmission processing, in a case where the determination unit 203a determines that the state of the machine tool has changed in the Nth Step S108 (in a case where the state of the machine tool has changed), the determination unit 203a determines the timing at which the transmission mask period calculated in the Nth Step S106 has elapsed from the point of determination that the ACK is received in Nth Step S104 (from the reception of ACK) as a transmission timing of the sensor information to be transmitted in (N+1)th Step S102. Note that the transmission mask period calculated in the Nth Step S106 is a time period corresponding to the time period from the transmission of the sensor information in the Nth Step S102 to the reception of the ACK from the GW 30 in the Nth Step S104.

Moreover, in the sensor information transmission processing, in a case where the determination unit 203a determines that the state of the machine tool has changed in the Nth Step S108, the determination unit 203a determines the timing at which the transmission mask period obtained by multiplying the time period from the transmission of the sensor information in Nth Step S102 to the reception of ACK from GW 30 in Nth Step S104 by an coefficient elapsed from the point of determination that the ACK is received in Nth Step S104 as a transmission timing of the sensor information to be transmitted in (N+1)th Step S102.

There may be a case where sensor information is simultaneously transmitted from the plurality of nodes 20 to the GW 30, leading to an increase in the traffic in the mesh networks 91 and 92. In this case, the GW 30 sequentially transmits the ACK to each of the plurality of nodes 20 one by one. This generates variation in the timing of receiving the ACK by the plurality of nodes 20, leading to variation in the length of the plurality of transmission mask periods calculated by the plurality of nodes 20. As a result, the plurality of nodes 20 transmits succeeding sensor information at different timings. In particular, when the coefficient is larger than one, the variation in the lengths of the plurality of transmission mask periods becomes greater than the variation at the timings of receiving the ACK in the plurality of nodes 20. Therefore, with the node 20 according to the embodiment, it is possible to suppress the occurrence of a situation in which a large amount of sensor information is transmitted from a large number of nodes 20 to the GW 30 by autonomously controlling the traffic.

Accordingly, with the node 20 according to the embodiment, it is possible to suppress the occurrence of collision, buffer overflow, or the like. Consequently, with the node 20 according to the embodiment, it is possible to suppress the occurrence of situations in which the GW 30 has difficulty in correctly receiving the sensor information due to occurrence of a collision, a buffer overflow, or the like, and the transmission of the ACK by the GW 30 is delayed.

As a result, with the node 20 according to the embodiment, it is possible to reliably and efficiently transmit the sensor information to the GW 30.

Moreover, with the node 20 according to the embodiment, the sensor information is transmitted after the reception of the ACK, and thus, the sensor information can be more reliably received by the GW 30. This enhances reliability of the communication between the node 20 and the GW 30.

Moreover, according to the embodiment, each of the plurality of nodes 20 individually calculates the transmission mask period, and thus, the GW 30 does not need to specify the communication interval with each of the nodes 20. This makes it possible to reduce the load on the GW 30 with the node 20 according to the embodiment.

Modification of Embodiment

While the above description is a case where the coefficient used in the above-described Step S106 for calculating the transmission mask period is a fixed value, the determination unit 203a may be configured to change the coefficient in accordance with the time period from the transmission of the sensor information to the reception of the ACK. Now, such an embodiment will be described as a modification of the embodiment.

Figure 4:
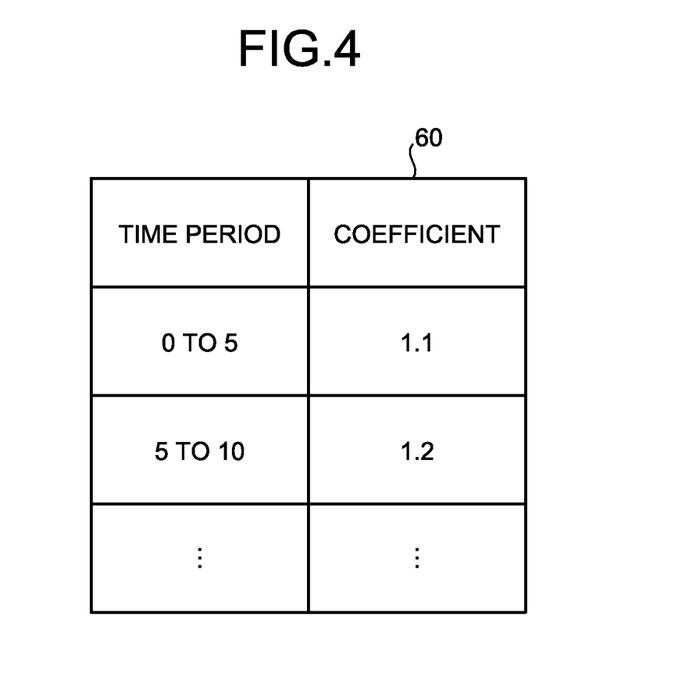
FIG. 4 is a diagram illustrating an exemplary data structure of a database according to a modification of the embodiment.

FIG. 4 is a diagram illustrating an exemplary data structure of a database 60 according to the modification of the embodiment. The database 60 is stored in the storage unit 201.

The database 60 includes items of "time period" and "coefficient". In the item of "time period", the range of time from the transmission of sensor information to the reception of an ACK is registered. For example, in an example illustrated in FIG. 4, a range larger than zero seconds and five seconds or less is registered in the "time period" item of a first record in the database 60. Moreover, a range larger than five seconds and 10 seconds or less is registered in the "time period" item of a second record in the database 60.

In a "coefficient" item, the coefficient corresponding to the range of time from the transmission of sensor information to the reception of the ACK is registered. For example, in an example illustrated in FIG. 4, a coefficient "1.1" corresponding to the range larger than zero seconds and five seconds or less is registered in the "time period" item of the first record in the database 60. Moreover, a coefficient "1.2" corresponding to the range larger than five seconds and 10 seconds or less is registered in the "coefficient" item of the second record in the database 60.

That is, the longer the time period from the transmission of sensor information to the reception of the ACK, the greater the coefficient registered in the database 60 illustrated in FIG. 4.

In the modification of the embodiment, the determination unit 203a performs processing described below in Step S106. For example, the determination unit 203a specifies, from all records in the database 60, a record in which the range including the time period from the transmission of the sensor information to the reception of the ACK is registered in the item of "time period".

Subsequently, the determination unit 203a obtains a coefficient registered in the "coefficient" item of the specified record. Subsequently, the determination unit 203a calculates a transmission mask period obtained by multiplying the time period from the transmission of the sensor information to the reception of the ACK by the obtained coefficient.

As described above, the determination unit 203a calculates the transmission mask period obtained by multiplying the time period from the transmission of the sensor information to the reception of the ACK by the coefficient corresponding to the time period from the transmission of the sensor information to the reception of the ACK.

According to the modification of the embodiment, the longer the time period from the transmission of the sensor information to the reception of the ACK, the greater the coefficient. Therefore, in a case where the sensor information is simultaneously transmitted from the plurality of nodes 20 to the GW 30, the variation in the length of the plurality of transmission mask periods calculated by the plurality of nodes 20 is further increased. As a result, the plurality of nodes 20 transmits succeeding sensor information at timings largely different from each other. Therefore, with the node 20 according to the modification of the embodiment, it is possible to further suppress the occurrence of a situation in which a large amount of sensor information is transmitted from a large number of nodes 20 to the GW 30. As a result, with the node 20 according to the modification of the embodiment, it is possible to further reliably and efficiently transmit the sensor information to the GW 30.

While the above-described embodiment and modification describe an example in which the determination unit 203a calculates the transmission mask period by multiplying the time period from the transmission of the sensor information to the reception of the ACK by a coefficient, the determination unit 203a may calculate the transmission mask period with another method.

For example, time synchronization is established between the node 20 and the GW 30, and then, the GW 30 transmits to the node 20 an ACK including information indicating the time point of reception of the sensor information. Subsequently, upon receiving the ACK, the determination unit 203a of the node 20 calculates the time period from the time point of reception of the sensor information by the GW 30 included in the ACK to the time point of reception of the ACK. Subsequently, the determination unit 203a calculates the transmission mask period by multiplying the calculated time period by a coefficient.

This transmission mask period is information in which the load of the ACK transmission processing on the GW 30 is relatively largely reflected among the load of the sensor information reception processing on the GW 30 and the load of the ACK transmission processing on the GW 30. In this manner, the node 20 determines the transmission timing of the sensor information using the transmission mask period in which the load of the ACK transmission processing on the GW 30 is relatively largely reflected. With this configuration, the node 20 can autonomously control traffic of the mesh networks 91 and 92 so as to reduce the load of the ACK transmission processing on the GW 30 in particular, among the load of sensor information reception processing on the GW 30, and the load of the ACK transmission processing on the GW 30.

While the above-described embodiment and the modification describe an exemplary case where the above-described technique is applied to a communication system configured to aggregate sensor information on nodes to a server, the above-described technique may also be applied to other systems.

According to one aspect of the present invention, it is possible to transmit information to a relay apparatus reliably and efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system comprising:
 a plurality of communication terminals;
 a server; and
 a relay apparatus, wherein
 each of the plurality of communication terminals includes:
  a memory; and
  a processor coupled to the memory, wherein the processor executes a process comprising:
   transmitting first information to the relay apparatus;
   receiving, from the relay apparatus, reception information in a different timings, indicating that the first information has been received by the relay apparatus, the reception information transmitted by the relay apparatus sequentially to each of the communication terminals one by one;
   multiplying a coefficient by a first time period to work out a second time period, the first time period being from transmission of the first information to reception of the reception information, which is different from that of other communication terminals;
   determining a timing at which the second time period elapsed after the reception of the reception information, which is different from that of other communication terminals, as a transmission timing of second information to be transmitted after transmission of the first information, wherein
   the coefficient is changed in accordance with the length of the first time period, and
 the relay apparatus is configured to receive the first information transmitted from the plurality of communication terminals, transmit the received first information to the server, and transmit the reception information sequentially to each of the at least one communication terminals that transmitted the first information one by one, the reception information indicating that the first information has been received by the relay apparatus.

2. The communication system according to claim 1, wherein a plurality of the coefficients is registered in the memory so that the longer the first time period become, the greater the coefficient is.

3. The communication system according to claim 1, wherein the first information indicates a first state of a detection target detected by a detection unit, the second information indicates a second state of the detection target detected by the detection unit, and in a case where the state of the detected detection target has changed from the first state to the second state, the determination unit determines a timing at which the second time period elapsed after reception of the reception information as the transmission timing of the second information.

4. The communication system according to claim 1, wherein the processor of each of the communication terminals determines the coefficient by referring to a table that registers therein a range or a threshold of a length of the first time period, and the coefficient in a related manner.

5. A communication system comprising:

a plurality of communication terminals;

a server; and a relay apparatus, wherein each of the plurality of communication terminals includes:

a memory; and a processor coupled to the memory, wherein the processor executes a process comprising:

transmitting first information to the relay apparatus;

receiving, from the relay apparatus, reception information in a different timings, indicating that the first information has been received by the relay apparatus, the reception information including information concerning receipt time of the first information by the relay apparatus, the reception information transmitted by the relay apparatus sequentially to each of the communication terminals one by one;

multiplying a coefficient by a first time period to work out a second time period, the first time period being from receipt of the first information specified by the information concerning receipt time, by the relay apparatus, to reception of the reception information, which is different from that of other communication terminals; and determining a timing at which the second time period elapsed after the reception of the reception information, which is different from that of other communication terminals, as a transmission timing of second information to be transmitted after transmission of the first information, and the relay apparatus is configured to receive the first information transmitted from the plurality of communication terminals, transmit the received first information to the server, and transmit the reception information sequentially to each of the at least one communication terminals that transmitted the first information one by one, the reception information indicating that the first information has been received by the relay apparatus.

6. The communication system according to claim 5, wherein the coefficient is changed in accordance with the length of the first time period.

7. The communication system according to claim 6, wherein a plurality of the coefficients is registered in the memory so that the longer the first time period becomes, the greater the coefficient is.

\* \* \* \* \*